(12) United States Patent
Peng et al.

(10) Patent No.: US 7,518,877 B2
(45) Date of Patent: Apr. 14, 2009

(54) MOUNTING APPARATUS FOR CIRCUIT BOARD

(75) Inventors: Wen-Tang Peng, Tu-Cheng (TW);
Mo-Ming Yu, Shenzhen (CN);
Shun-Hai Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,273

(22) Filed: Jul. 21, 2006

(65) Prior Publication Data

US 2007/0167071 A1 Jul. 19, 2007

(51) Int. Cl.
*H05K 7/16* (2006.01)
(52) U.S. Cl. ............... 361/726; 361/732; 361/740; 361/747; 361/759; 361/796; 361/801; 361/610; 361/615
(58) Field of Classification Search ............. 361/726, 361/732, 740, 747, 759, 796, 801
See application file for complete search history.

(56) References Cited

U.S. PATENT DOCUMENTS

| 5,187,643 | A |   | 2/1993  | I-Shou          |         |
|-----------|---|---|---------|-----------------|---------|
| 5,277,615 | A |   | 1/1994  | Hastings et al. |         |
| 5,306,079 | A | * | 4/1994  | Liu ............ | 312/223.2 |
| 5,340,340 | A |   | 8/1994  | Hastings et al. |         |
| 5,566,383 | A | * | 10/1996 | Gildea et al. ........ | 361/685 |
| 5,768,099 | A | * | 6/1998  | Radloff et al. ....... | 361/685 |
| RE35,915  | E |   | 10/1998 | Hastings et al. |         |
| 6,234,820 | B1|   | 5/2001  | Perino et al.   |         |
| 6,381,149 | B1| * | 4/2002  | Megason et al. ..... | 361/801 |
| 6,721,177 | B1| * | 4/2004  | Wang et al. ........ | 361/685 |
| 6,724,621 | B1| * | 4/2004  | Liang ............ | 361/685 |
| 6,762,932 | B2|   | 7/2004  | Regimbal et al. |         |
| 6,798,652 | B2| * | 9/2004  | Wang et al. ........ | 361/685 |
| 6,940,728 | B2| * | 9/2005  | Ta ............... | 361/759 |
| 6,970,361 | B2|   | 11/2005 | Jansen          |         |
| 6,971,893 | B2|   | 12/2005 | Barringer et al.|         |
| 7,012,813 | B2| * | 3/2006  | Wang et al. ........ | 361/801 |
| 7,180,732 | B2| * | 2/2007  | Meehan et al. ...... | 361/685 |
| 2005/0111201 | A1 | * | 5/2005 | Suekawa et al. ..... | 361/732 |
| 2006/0164803 | A1 | * | 7/2006 | Chen et al. ........ | 361/685 |
| 2006/0169867 | A1 | * | 8/2006 | Chen et al. ........ | 248/694 |
| 2006/0198111 | A1 | * | 9/2006 | Way ............... | 361/752 |
| 2007/0025095 | A1 | * | 2/2007 | Beall et al. ....... | 361/796 |

FOREIGN PATENT DOCUMENTS

TW    M253880    12/2004
TW    M269541    7/2005

* cited by examiner

*Primary Examiner*—Dean A. Reichard
*Assistant Examiner*—Hoa C Nguyen
(74) *Attorney, Agent, or Firm*—Wei Te Chung

(57) ABSTRACT

A mounting apparatus for mounting a circuit board that is electrically connectable with at least one hard disk drive, includes a chassis for receiving the circuit board, a bracket for receiving the at least one hard disk drive, and a securing member for pressing the circuit board. The bracket is mounted to the chassis. A rear end of the bracket faces the circuit board. The securing member is pivotably mounted to the bracket.

17 Claims, 4 Drawing Sheets

MOUNTING APPARATUS FOR CIRCUIT BOARD

FIELD OF THE INVENTION

The present invention relates to mounting apparatuses, and particularly to a mounting apparatus readily allowing installation or removal of a circuit board which is electrically connectable to hard disk drives.

DESCRIPTION OF PRIOR ART

Generally, there are circuit boards mounted in a server for electrically connecting to hard disk drives of the server. The circuit boards are electrically connected to a motherboard of the server for transmitting data between the motherboard and the hard disk drives.

A conventional circuit board is generally attached to rear sides of hard disk drive brackets of a server by bolts or rails. Examples are disclosed in Taiwan Patent Application Nos. 93202485, and 93212828. Fixing a circuit board to the brackets with bolts is unduly laborious and time-consuming. Furthermore, the server needs extra operating space for carrying out repairs.

What is desired, therefore, is a mounting apparatus which readily allows installation or removal of a circuit board to or from a bracket.

SUMMARY OF THE INVENTION

An exemplary mounting apparatus for mounting a circuit board that is electrically connectable with at least one hard disk drive, includes a chassis for receiving the circuit board, a bracket for receiving the at least one hard disk drive, and a securing member for pressing the circuit board. The bracket is mounted to the chassis. A rear end of the bracket faces the circuit board. The securing member is pivotably mounted to the bracket.

Other advantages and novel features will become more apparent from the following detailed description when taken in conjunction with the accompanying drawings, in which:

DETAILED DESCRIPTION OF THE INVENTION

Figure 1:
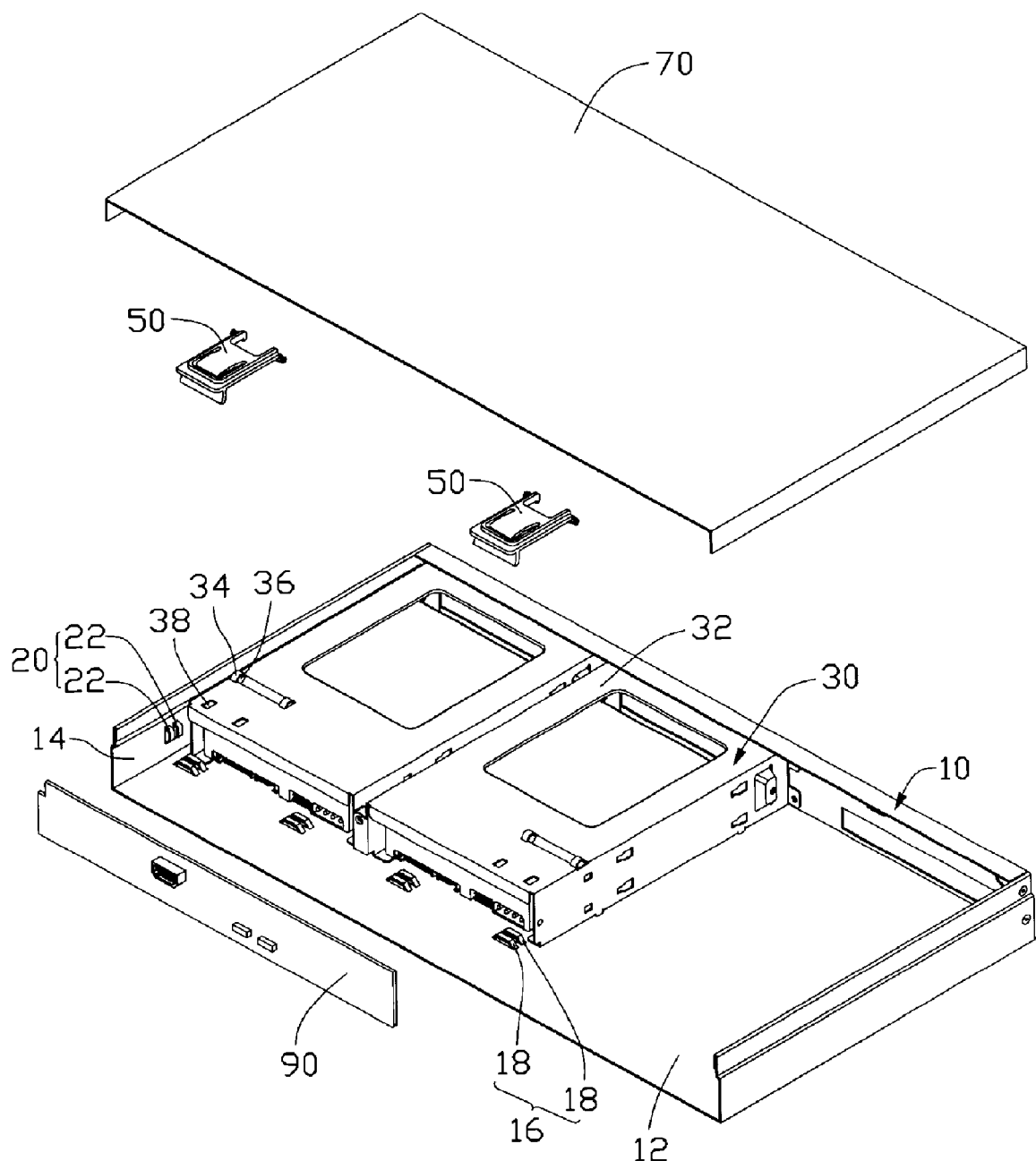
FIG. 1 is an exploded, isometric view of a mounting apparatus for a circuit board in accordance with a preferred embodiment of the present invention, together with a circuit board, the mounting apparatus includes a chassis, and a pair of securing members.

Referring to FIG. 1, a mounting apparatus in accordance with a preferred embodiment of the present invention is shown for mounting a circuit board 90 to a computer enclosure. The mounting apparatus includes a chassis of the computer enclosure, and a pair of securing members 50.

The chassis includes a base 10, a pair of brackets 30 for holding hard disk drives, and a cover 70. The base 10 includes a bottom wall 12, and a sidewall 14 extending up from a side of the bottom wall 12. The brackets 30 are respectively mounted to the base 10. The bottom wall 12 includes a plurality of limiting members 16. Each limiting member 16 includes a pair of limiting tabs 18 parallel to each other and stamped up from the bottom wall 12 adjacent rear sides of the brackets 30. The sidewall 14 includes a locating member 20. The locating member 20 includes a pair of locating tabs 22 parallel to each other and stamped in from the sidewall 14. The locating member 20 is in alignment with the limiting members 16. A distance between the limiting tabs 18 is greater than that between the locating tabs 22. The distance between the locating tabs 22 is greater than or equal to a thickness of the circuit board 90.

Each bracket 30 includes a board 32 parallel to the bottom wall 12 of the base 10. A depressed portion (not labeled) is defined in the board 32 adjacent a rear side. Two pivot tabs 34 each defining a pivot hole 36 therebelow are stamped up from the board 32 at opposite ends of the depressed portion. Two locking holes 38 are defined in a rear corner of the board 32.

Figure 2:
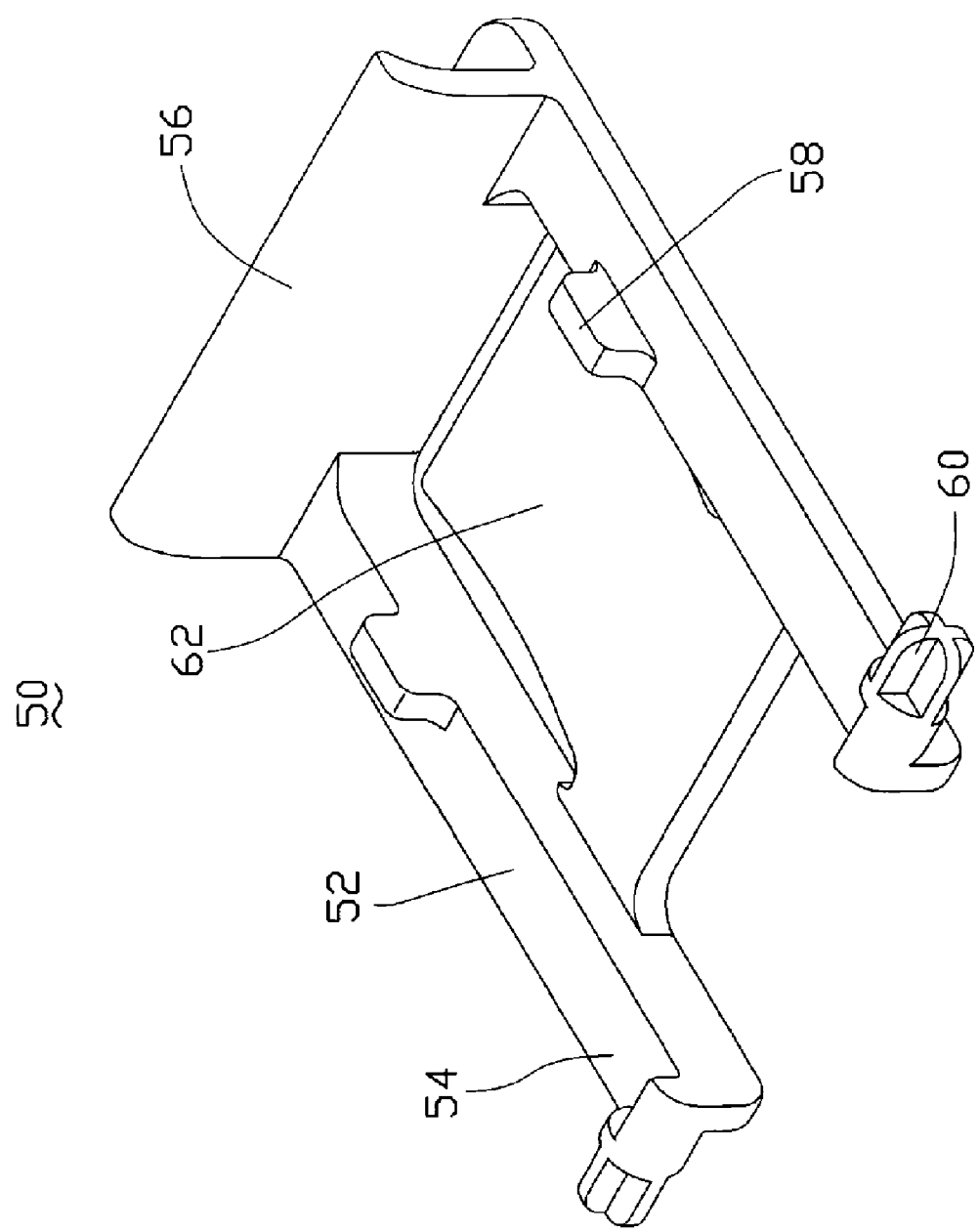
FIG. 2 is an inverted view of the securing member of FIG. 1.

Referring to FIG. 2, each securing member 50 includes a body 52, a pair of extension portions 54 extends in a same direction from opposite sides of one end of the body 52, an arc-shaped orienting portion 56 perpendicularly extending down from an opposite end thereof, a pair of protrusions 58 protruding down from opposite sides of a bottom of the body 52, and an arc-shaped resilient tab 62 is formed on the body 52. A shaft 60 perpendicularly extends out from a distal end of each extension portion 54.

Figure 3:
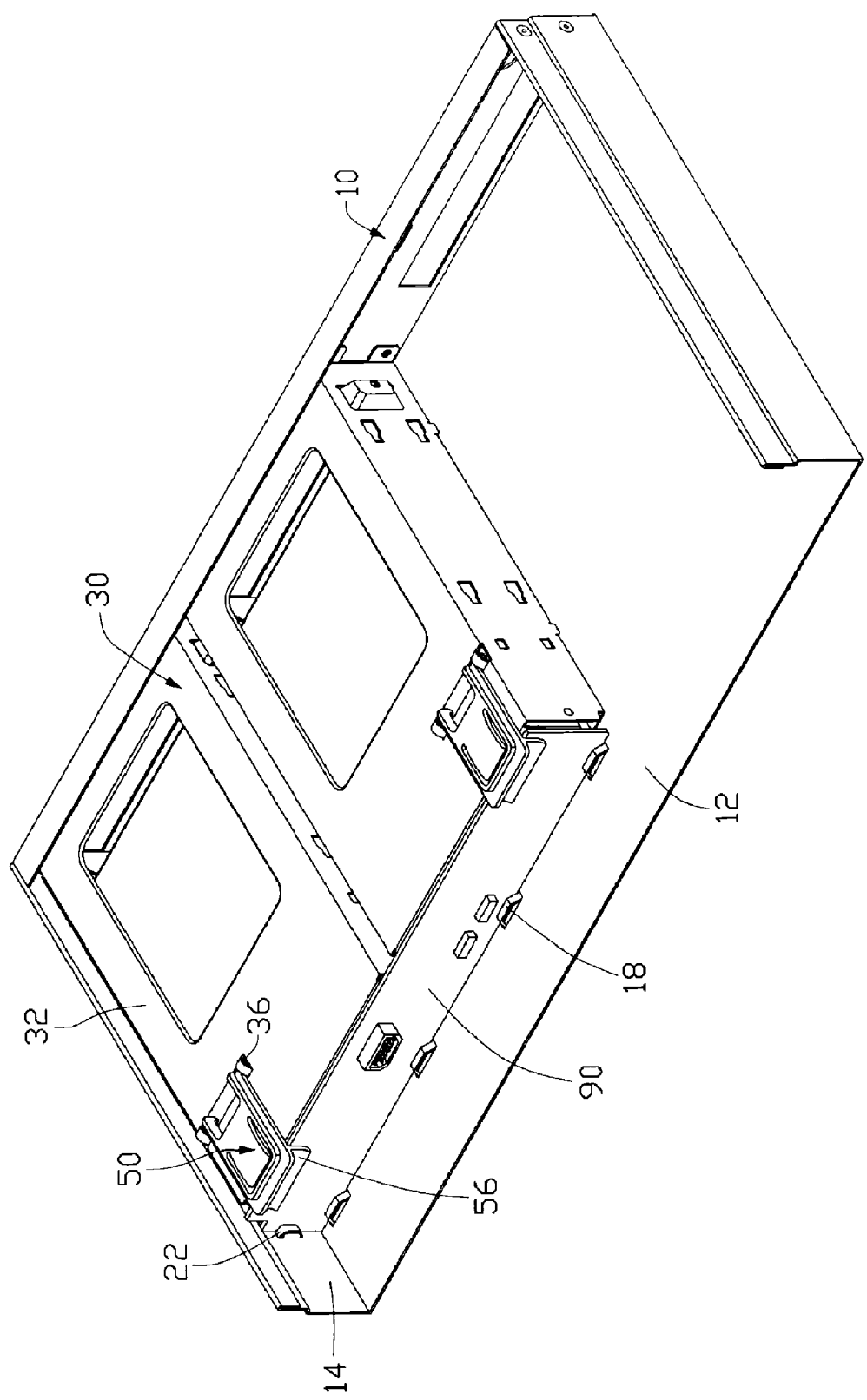
FIG. 3 is a partially assembled view of FIG. 1.
Figure 4:
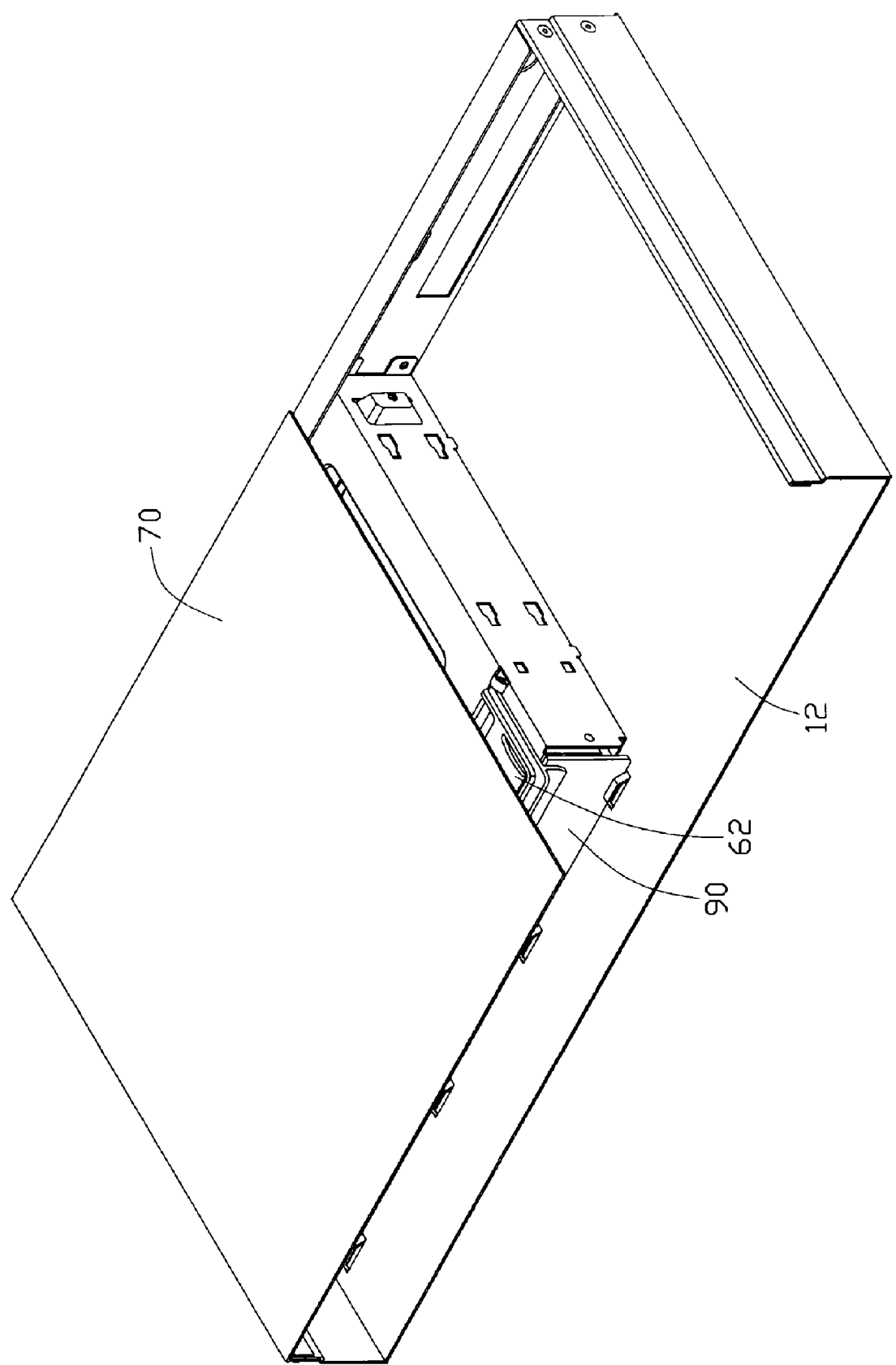
FIG. 4 is an assembled view of FIG. 1.

Referring also to FIGS. 3 and 4, in assembly, the shaft 60 of each securing member 50 is received in the corresponding pivot hole 36 of the corresponding bracket 30. Thus, the securing members 50 are pivotably mounted to the corresponding brackets 30. The cover 70 is mounted to the base 10 to resiliently press the resilient tabs 62 of the securing members 50.

In assembling the circuit board 90, the circuit board 90 is received between locating tabs 18 of each limiting member 16. The circuit board 90 is slid toward the sidewall 14 to be located between the pair of locating tabs 22. Each securing member 50 is rotated. The body 52 of each securing member 50 presses a top of the circuit board 90. The orientating portion 56 of each securing member 50 presses a side of the circuit board 90 opposite to the brackets 30. The protrusions 58 of each securing member 50 engage in the corresponding locking holes 38 of the corresponding bracket 30. Thus, the circuit board 90 is secured.

Additionally, the securing members 50 may be pivotably mounted to only one bracket.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mounting apparatus for mounting a circuit board that is electrically connectable with at least one hard disk drive, the mounting apparatus comprising:
    a chassis for receiving the circuit board;
    a bracket for receiving the at least one hard disk drive, the bracket mounted to the chassis, a rear end of the bracket facing the circuit board; and
    a securing member for pressing a top edge of the circuit board, the securing member pivotably mounted to the bracket about a rotation axis parallel to the top edge of the circuit board;

wherein the securing member comprises a body, an end of the body is pivotably mounted to the bracket, a free end of the body is for pressing the top edge of the circuit board;

wherein the securing member further comprises an arc-shaped resilient tab bending up from the body, the chassis comprises a base for receiving the circuit board and the bracket, and a cover secured to the base to resiliently press the resilient tab.

2. The mounting apparatus as claimed in claim 1, wherein the securing member further comprises an orienting portion perpendicularly extending down from the free end, for pressing a side of the circuit board opposite to the bracket.

3. The mounting apparatus as claimed in claim 1, wherein the base comprises a bottom wall, and a sidewall extending up from a side of the bottom wall, a lower portion of the circuit board is mounted to the bottom wall, an end of the circuit board is mounted to the sidewall.

4. The mounting apparatus as claimed in claim 3, wherein the bracket comprises a board parallel to the bottom wall of the base, the securing member is pivotably mounted to the board.

5. The mounting apparatus as claimed in claim 4, wherein the securing member further comprises two extension portions extending in a same direction from the body, two shafts extend out from the extension portions respectively, two pivot holes are defined in the board of the bracket for pivotably receiving the corresponding shafts.

6. The mounting apparatus as claimed in claim 5, wherein two pivot tabs are stamped up from the board of the bracket, the pivot holes are defined under the corresponding pivot tabs respectively.

7. The mounting apparatus as claimed in claim 4, wherein two locking holes are defined in the board of the bracket, two protrusions protrude down from a bottom of the body for engaging in the corresponding locking holes.

8. The mounting apparatus as claimed in claim 3, wherein the base further comprises at least one limiting member formed on the bottom wall, the at least one limiting member comprises a pair of limiting tabs parallel to each other and stamped up from the bottom wall, the lower portion of the circuit board is located between the pair of limiting tabs.

9. The mounting apparatus as claimed in claim 8, wherein the base still further comprises at least one locating member formed on the sidewall, the at least one locating member comprises a pair of locating tabs parallel to each other and stamped in from the sidewall, the corresponding end of the circuit board is located between the pair of locating tabs.

10. The mounting apparatus as claimed in claim 9, wherein a distance between the pair of limiting tabs is greater than that between the pair of locating tabs.

11. The mounting apparatus as claimed in claim 1, wherein the base comprising a bottom wall for locating a bottom opposite to the top edge of the circuit board, the bracket comprises a board parallel to the bottom wall, the corresponding end of the body is pivotably mounted to the board of the bracket, the body of the securing member is parallel to the top edge of the circuit board when the circuit board is fixed by the securing member.

12. An electronic device, comprising:
a chassis;
a bracket mounted to the chassis;
a hard disk drive mounted to the bracket;
a circuit board electrically connected to the hard disk drive, the circuit board mounted to the chassis and located at and parallel to a rear side of the bracket; and
a securing member pivotably mounted to the bracket about a rotation axis parallel to a top edge of the circuit board to contact the top edge;
wherein the chassis comprises a bottom wall for mounting the bracket, the bracket comprises a board parallel to the bottom wall, the securing member further comprises two extension portions extending in a same direction from the body, two shafts extend out from the extension portions respectively, two pivot holes are defined in the board of the bracket for pivotably receiving the corresponding shafts.

13. The electronic device as claimed in claim 12, wherein the securing member comprises a body, an end of the body is pivotably mounted to the bracket, an orienting portion perpendicularly extends down from a free end of the body, for pressing a side of the circuit board opposite to the bracket.

14. The electric device as claimed in claim 12, wherein the chassis comprises a bottom wall, and a sidewall, at least one limiting member is formed on the bottom wall, the at least one limiting member comprises a pair of limiting tabs parallel to each other and stamped up from the bottom wall, the lower portion of the circuit board is located between the pair of limiting tabs.

15. The electronic device as claimed in claim 14, wherein at least one locating member is formed on the sidewall, the at least one locating member comprises a pair of locating tabs parallel to each other and stamped in from the sidewall, the corresponding end of the circuit board is located between the pair of locating tabs.

16. The electronic device as claimed in claim 15, wherein a distance between the pair of limiting tabs is greater than that between the pair of locating tabs.

17. The electronic apparatus as claimed in claim 12, wherein the chassis comprises a base, wherein the base comprising a bottom wall for locating a bottom opposite to the top edge of the circuit board, the bracket comprises a board parallel to the bottom wall, the securing member comprises a body, an end of the body is pivotably mounted to the board of the bracket, a free end of the body is parallel to and pressing the top edge of the circuit board when the circuit board is fixed by the securing member.

* * * * *